US012652743B2

(12) United States Patent
Lu et al.

(10) Patent No.: US 12,652,743 B2
(45) Date of Patent: Jun. 9, 2026

(54) LIGHTING SYSTEM WITH ILLUMINATION RANGE ADJUSTMENT FUNCTION BASED ON RADIO FREQUENCY SIGNAL CONTROL

(71) Applicant: Xiamen PVTECH Co., Ltd., Xiamen (CN)

(72) Inventors: Fuxing Lu, Xiamen (CN); Ronghui Wang, Xiamen (CN)

(73) Assignee: Xiamen PVTECH Co., Ltd., Xiamen (CN)

( * ) Notice: Subject to any disclaimer, the term of this patent is extended or adjusted under 35 U.S.C. 154(b) by 55 days.

(21) Appl. No.: 18/934,269

(22) Filed: Nov. 1, 2024

(65) Prior Publication Data

US 2025/0203740 A1 Jun. 19, 2025

(30) Foreign Application Priority Data

Dec. 18, 2023 (CN) ........................ 202311759377.0

(51) Int. Cl.
*H05B 47/19* (2020.01)
*H05B 47/105* (2020.01)
*H05B 47/155* (2020.01)

(52) U.S. Cl.
CPC ........... *H05B 47/19* (2020.01); *H05B 47/105* (2020.01); *H05B 47/155* (2020.01)

(58) Field of Classification Search
CPC ...... H05B 47/19; H05B 45/20; H05B 47/115; H05B 47/11; H05B 45/10; H05B 45/00
See application file for complete search history.

(56) References Cited

U.S. PATENT DOCUMENTS

| | | | | |
|---|---|---|---|---|
| 9,642,218 B1 * | 5/2017 | Dureiko | ................. | G08C 17/02 |
| 2016/0007431 A1 * | 1/2016 | Bosua | ................... | F21V 23/023<br>315/307 |
| 2016/0061396 A1 * | 3/2016 | Bosua | ..................... | F21K 9/238<br>362/231 |
| 2018/0147386 A1 * | 5/2018 | Sato | ....................... | H05B 45/20 |
| 2018/0202640 A1 * | 7/2018 | He | ......................... | H05B 47/19 |
| 2021/0247495 A1 * | 8/2021 | Hu | ........................ | G01S 7/4861 |

* cited by examiner

*Primary Examiner* — Wei (Victor) Y Chan
(74) *Attorney, Agent, or Firm* — BruceStone LLP; Joseph A. Bruce

(57) ABSTRACT

The present invention discloses a lighting system with illumination range adjustment function based on radio frequency signal control, which includes a radio frequency control module, first light-emitting module and second light-emitting module. The radio frequency control module is disposed at a central point and generates a radio frequency control signal. The first light-emitting module receives the radio frequency control signal. A first reference circle passes through the first light-emitting module, and the center thereof coincides with the central point. The second light-emitting module receives the radio frequency control signal. A second reference circle passes through the second light-emitting module, and the center thereof coincides with the central point. The first light-emitting module is activated when the signal strength of the radio frequency control signal exceeds a threshold value. The second light-emitting module is activated when the signal strength of the radio frequency control signal exceeds the threshold value.

10 Claims, 9 Drawing Sheets

LIGHTING SYSTEM WITH ILLUMINATION RANGE ADJUSTMENT FUNCTION BASED ON RADIO FREQUENCY SIGNAL CONTROL

BACKGROUND OF THE INVENTION

1. Field of the Invention

The present invention relates to a lighting system, in particular to a lighting system with illumination range adjustment function based on radio frequency signal control.

2. Description of the Prior Art

Intelligent lighting devices generally adopt technologies such as sound control, microwave sensing, and infrared sensing. However, in environments like mines, tunnels, or automated production workshops, noise or high temperatures are often generated, which can interfere with the sensing functions of currently available intelligent lighting devices. This interference renders these lighting devices unsuitable for use in the aforementioned environments. For example, tunnels in stone factories often use conveyor belts to transport stones. Since the stones are in motion, microwave sensors can be triggered by the stones. Similarly, due to the high temperature of the stones, infrared sensors can also be activated by the heat from the stones. Therefore, currently available intelligent smart lighting devices cannot operate normally in the aforementioned environments.

SUMMARY OF THE INVENTION

One embodiment of the present invention provides a lighting system with illumination range adjustment function based on radio frequency signal control, which includes a radio frequency control module, a first light-emitting module and a second light-emitting module. The radio frequency control module is disposed at a central point and generates a radio frequency control signal. The first light-emitting module receives the radio frequency control signal. A first reference circle passes through the first light-emitting module, and the center of the first reference circle coincides with the central point. The second light-emitting module receives the radio frequency control signal. A second reference circle passes through the second light-emitting module, and the center of the second reference circle coincides with the central point. The first light-emitting module is activated when the signal strength of the radio frequency control signal exceeds a threshold value, and the second light-emitting module is activated when the signal strength of the radio frequency control signal exceeds the threshold value.

In one embodiment, the signal strength of the radio frequency control signal is lower than the threshold value after the radio frequency control signal is transmitted a preset distance.

In one embodiment, the diameter of the second reference circle is greater than the diameter of the first reference circle.

In one embodiment, the first light-emitting module remains in off state when the signal strength of the radio frequency control signal is less than the threshold value.

In one embodiment, the second light-emitting module remains in off state when the signal strength of the radio frequency control signal is less than the threshold value.

In one embodiment, the first light-emitting module includes a first signal receiving unit, a first control unit, and a first light-emitting unit. The first signal receiving unit receives the radio frequency control signal. The first control unit compares the signal strength of the radio frequency control signal with the threshold value, and activates the first light-emitting unit when the signal strength of the radio frequency control signal exceeds the threshold value.

In one embodiment, the second light-emitting module includes a second signal receiving unit, a second control unit, and a second light-emitting unit. The second signal receiving unit receives the radio frequency control signal. The second control unit compares the signal strength of the radio frequency control signal with the threshold value, and activates the second light-emitting unit when the signal strength of the radio frequency control signal exceeds the threshold value.

In one embodiment, the radio frequency control module includes a processing unit, a signal transmitting unit, and a signal adjustment unit. The signal adjustment unit generates an intensity signal, and the processing unit controls the signal transmitting unit to generate the radio frequency control signal corresponding to the intensity signals according to the intensity signal.

In one embodiment, the lighting system further includes a third light-emitting module. The third light-emitting module receives the radio frequency control signal. A third reference circle passes through the third light-emitting module, and the center of the third reference circle coincides with the central point. The third light-emitting module is activated when the signal strength of the radio frequency control signal exceeds the threshold value and remains in off state when the signal strength of the radio frequency control signal is less than the threshold value.

In one embodiment, the diameter of the third reference circle is greater than the diameter of the second reference circle.

The lighting system with illumination range adjustment function based on radio frequency signal control in accordance with the embodiments of the present invention may have the following advantages:

(1) In one embodiment of the present invention, a lighting system includes a radio frequency control module, a first light-emitting module and a second light-emitting module. The radio frequency control module is disposed at a central point and generates a radio frequency control signal. The first light-emitting module receives the radio frequency control signal. A first reference circle passes through the first light-emitting module, and the center of the first reference circle coincides with the central point. The second light-emitting module receives the radio frequency control signal. A second reference circle passes through the second light-emitting module, and the center of the second reference circle coincides with the central point. The first light-emitting module is activated when the signal strength of the radio frequency control signal exceeds a threshold value, and the second light-emitting module is activated when the signal strength of the radio frequency control signal exceeds the threshold value. The first light-emitting module remains in off state when the signal strength of the radio frequency control signal is less than the threshold value. The second light-emitting module remains in off state when the signal strength of the radio frequency control signal is less than the threshold value. As described above, the lighting system has an illumination adjustment function based on radio frequency signal control. That is to say, the light-emitting module of the lighting system can filter out radio frequency control signals with insufficient signal strength and only activate when the signal strength of the radio frequency control signal exceeds the preset threshold value. Therefore, the control mechanism of the lighting system can be applied in high-temperature or highly interfered environments to prevent the light-emitting module from being triggered by mistake. As a result, the lighting system can be more comprehensive in application.

(2) In one embodiment of the present invention, the lighting system has an illumination range adjustment function based on radio frequency signal control, which can adjust the signal strength of the radio frequency control signal to change the illumination range of the lighting system. Therefore, the lighting system can provide an effective illumination range adjustment mechanism to offer good lighting functionality. In this way, the lighting device can meet actual requirements.

(3) In one embodiment of the present invention, the radio frequency control module of the lighting system has a plurality of power adjustment switches, each corresponding to different power levels. Through this design, the user can directly change the illumination range of the lighting system by operating the power adjustment switches of the radio frequency control module, allowing the lighting system to achieve the desired illumination range. Therefore, the lighting system can be more convenient in use and meet the user's needs.

(4) In one embodiment of the present invention, the lighting system has an illumination range adjustment function based on radio frequency signal control, which can be used to implement various intelligent functions. In this way, the lighting system can be integrated with various currently available intelligent systems and achieve good integration effects. Therefore, the lighting system can meet the needs of different applications.

(5) In one embodiment of the present invention, the design of the lighting system is simple, so it can achieve the desired effect without significantly increasing costs and can effectively solve the problems of the currently available technology. Therefore, the lighting system can achieve excellent practicality and meet the trends of future development.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
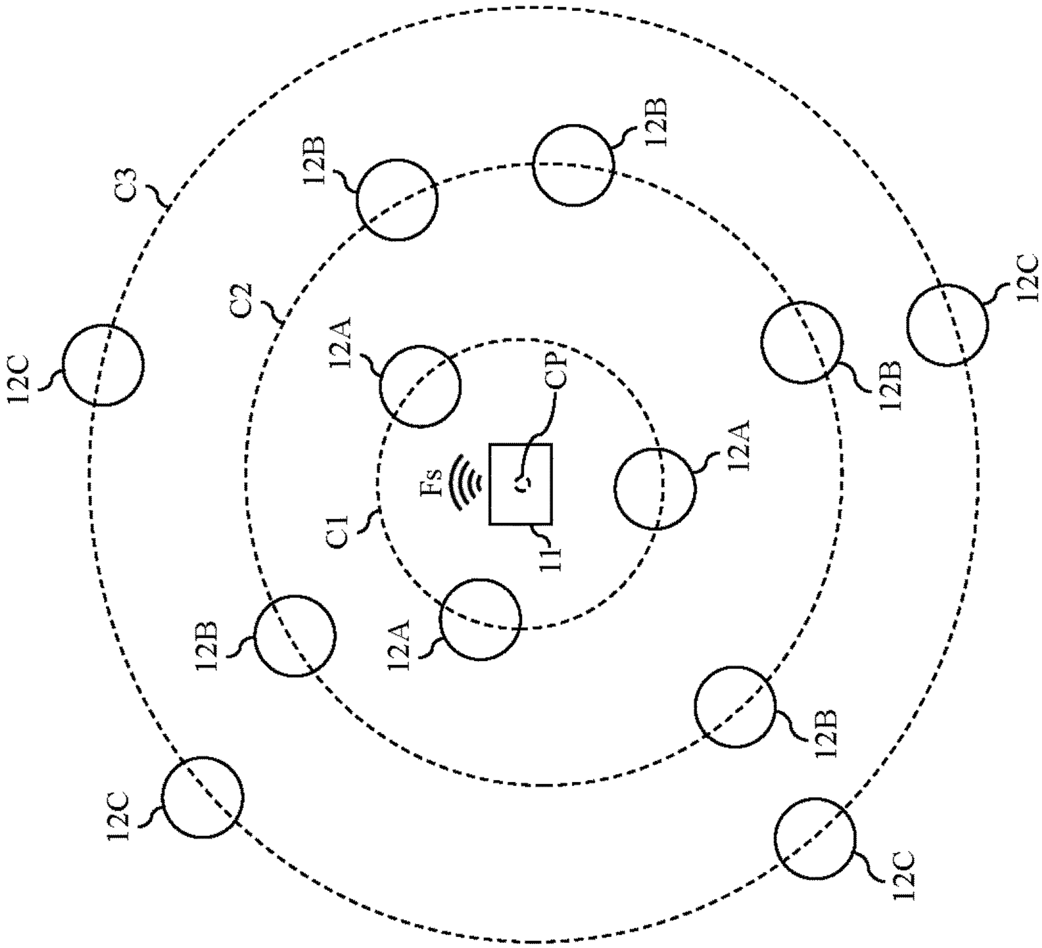
FIG. 1 is the schematic view of the lighting system with illumination range adjustment function based on radio frequency signal control in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is the schematic view of the lighting system with illumination range adjustment function based on radio frequency signal control in accordance with one embodiment of the present invention. As shown in FIG. 1, the lighting system 1 includes a radio frequency control module 11, a plurality of first light-emitting modules 12A, a plurality of second light-emitting modules 12B, and a plurality of third light-emitting modules 13C. The lighting system 1 can be installed in a building to provide illumination. The aforementioned building can be a mine, tunnel, or automated production workshop.

The radio frequency control module 11 is disposed at the central point CP and generates a radio frequency control signal Fs.

Each first light-emitting module 12A receives the radio frequency control signal Fs. A first reference circle C1 passes through the first light-emitting modules 12A, and the center of first reference circle C1 coincides with the central point CP.

Each second light-emitting module 12B receives the radio frequency control signal Fs. A second reference circle C2 passes through the second light-emitting modules 12B, and the center of the second reference circle C2 coincides with the central point CP. The diameter of the second reference circle C2 is greater than the diameter of the first reference circle C1; that is, the distance between any second light-emitting module 12B and the radio frequency control module 11 is greater than the distance between any first light-emitting module 12A and the radio frequency control module 11.

Each third light-emitting module 12C receives the radio frequency control signal Fs. A third reference circle C3 passes through third light-emitting module 12C, and the center of the third reference circle C3 coincides with the central point CP. The diameter of the third reference circle C3 is greater than the diameter of the second reference circle C2; that is, the distance between any third light-emitting module 12C and the radio frequency control module 11 is greater than the distance between any second light-emitting module 12B and the radio frequency control module 11.

When the radio frequency control module 11 generates the radio frequency control signal Fs, the first light-emitting module 12A receives the radio frequency control signal Fs and compares the radio frequency control signal Fs with a preset threshold value. If the signal strength of the radio frequency control signal Fs is greater than the threshold value, the first light-emitting module 12A enters on state. Conversely, if the signal strength of radio frequency control signal Fs is less than the threshold value, first light-emitting module 12A remains in off state.

When the radio frequency control module 11 generates the radio frequency control signal Fs, the second light-emitting module 12B receives the radio frequency control signal Fs and compares the radio frequency control signal Fs with the aforementioned threshold value. If the signal strength of the radio frequency control signal Fs is greater than the threshold value, the second light-emitting module 12B enters on state. Conversely, if the signal strength of the radio frequency control signal Fs is less than the threshold value, the second light-emitting module 12B remains in off state.

Similarly, when the radio frequency control module 11 generates the radio frequency control signal Fs, the third light-emitting module 12C receives the radio frequency control signal Fs and compares the radio frequency control signal Fs with the aforementioned threshold value. If the signal strength of the radio frequency control signal Fs is greater than the threshold value, the third light-emitting module 12C enters on state. Conversely, if the signal strength of the radio frequency control signal Fs is less than the threshold value, the third light-emitting module 12C remains in off state.

Since the signal strength of the radio frequency control signal Fs will attenuate during transmission, the signal strength of radio frequency control signal Fs will be lower than the threshold value after a preset distance. Therefore, only the light-emitting modules within a specific range will be activated. In this embodiment, the distance between the third light-emitting module 12C and the radio frequency control module 11 is greater than the preset distance. Therefore, when the user carries the radio frequency control module 11 and stands at central the point CP and the radio frequency control module 11 generates radio frequency control signal Fs, the first light-emitting modules 12A and the second light-emitting modules 12B enter on state to provide sufficient light for the user. Through the above mechanism, the user can move freely in the place, and when the user moves to another position, the light-emitting modules within a certain range around the user will enter on state to provide sufficient light for the user.

As previously stated, the lighting system 1 has the illumination range adjustment function based on radio frequency signal control. That is, the light-emitting modules of the lighting system 1 can filter out radio frequency control signals Fs with insufficient signal strength and only activate when the signal strength of the radio frequency control signal Fs is greater than a preset threshold value. Therefore, the control mechanism of the lighting system 1 can be applied in high-temperature or highly interfered environments to prevent the light-emitting modules from being mistakenly triggered, making the application of lighting system 1 more comprehensive. Additionally, the lighting system 1 has the illumination range adjustment function based on radio frequency signals, which can adjust the signal strength of the radio frequency control signal Fs to change the illumination range of lighting system 1. Therefore, the lighting system 1 can provide an effective illumination range adjustment mechanism to offer a good illumination function, such that the lighting system 1 can meet actual requirements.

In another embodiment, the first light-emitting module 12A is activated when the signal strength of radio frequency control signal Fs exceeds a first threshold value, and the second light-emitting module 12B is activated when the signal strength of radio frequency control signal Fs exceeds a second threshold value. The second threshold value is greater than the first threshold value. The first light-emitting module 12A remains in off state when the signal strength of the radio frequency control signal Fs is less than the first threshold value. The second light-emitting module 12B remains in off state when the signal strength of the radio frequency control signal Fs is less than the second threshold value.

The embodiment just exemplifies the present invention and is not intended to limit the scope of the present invention; any equivalent modification and variation according to the spirit of the present invention is to be also included within the scope of the following claims and their equivalents.

Figure 2:
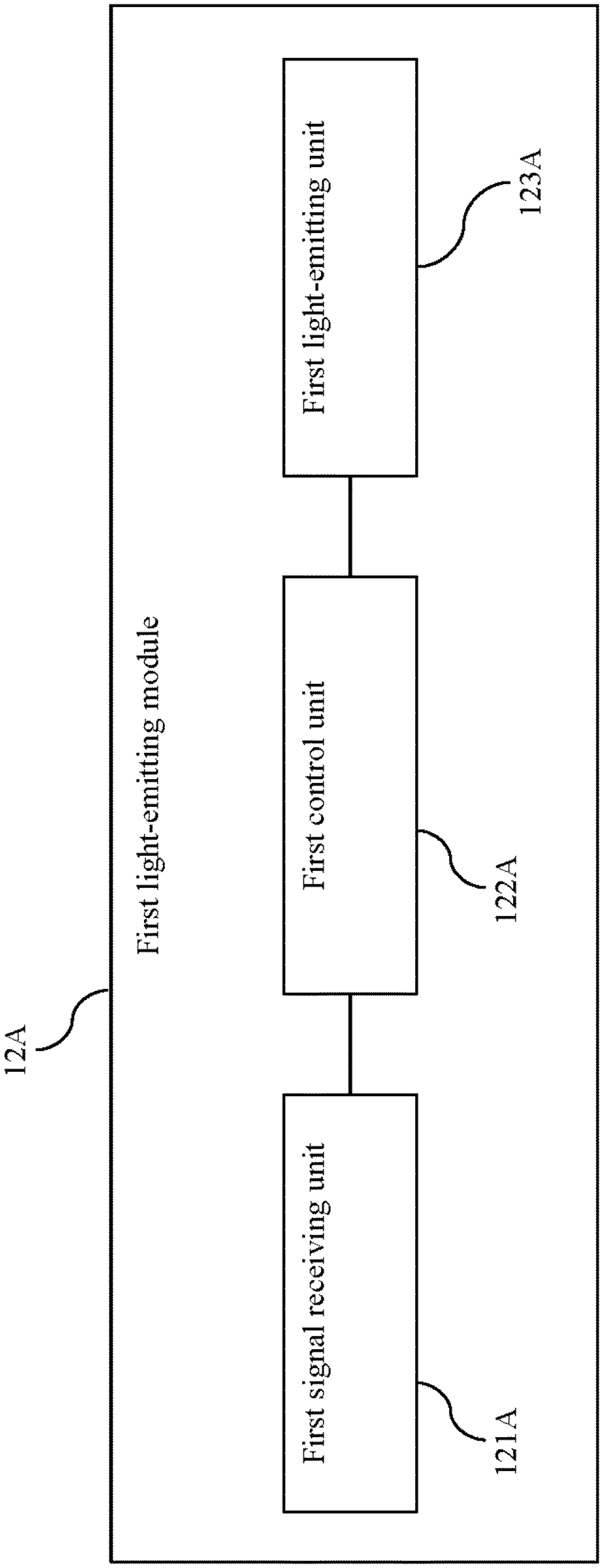
FIG. 2 is the block diagram of the circuit of the first light-emitting module of the lighting system with illumination range adjustment function based on radio frequency signal control in accordance with one embodiment of the present invention.
Figure 3:
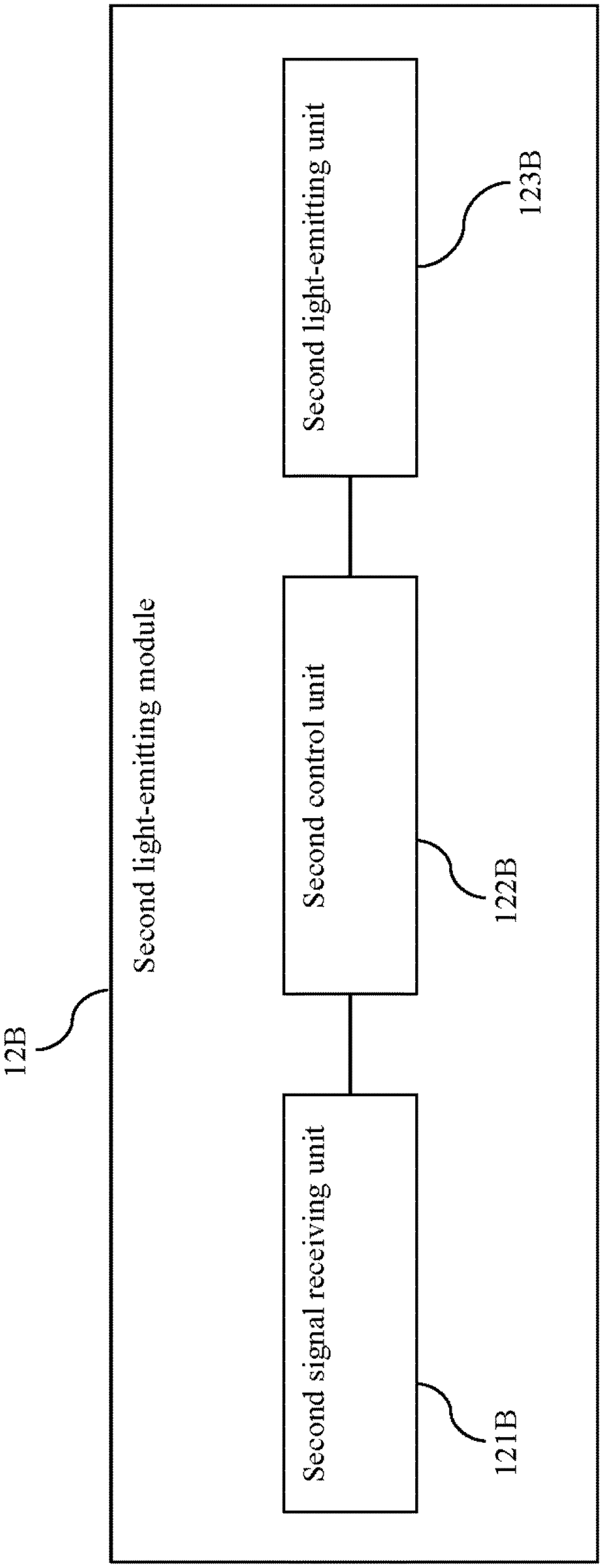
FIG. 3 is the block diagram of the circuit of the second light-emitting module of the lighting system with illumination range adjustment function based on radio frequency signal control in accordance with one embodiment of the present invention.
Figure 4:
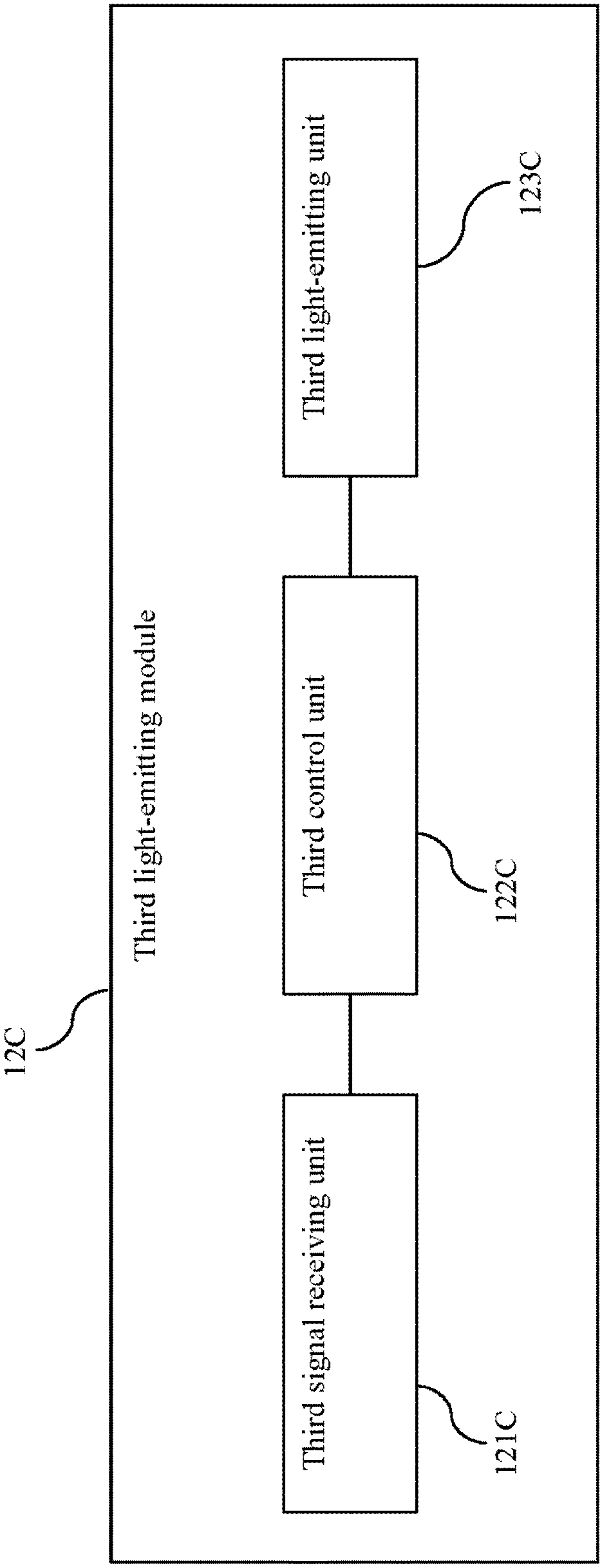
FIG. 4 is the block diagram of the circuit of the third light-emitting module of the lighting system with illumination range adjustment function based on radio frequency signal control in accordance with one embodiment of the present invention.

Please refer to FIG. 2 to FIG. 4. FIG. 2 is the block diagram of the circuit of the first light-emitting module of the lighting system with illumination range adjustment function based on radio frequency signal control in accordance with one embodiment of the present invention. FIG. 3 is the block diagram of the circuit of the second light-emitting module of the lighting system with illumination range adjustment function based on radio frequency signal control in accordance with one embodiment of the present invention. FIG. 4 is the block diagram of the circuit of the third light-emitting module of the lighting system with illumination range adjustment function based on radio frequency signal control in accordance with one embodiment of the present invention. As shown in FIG. 2, the first light-emitting module 12A includes a first signal receiving unit 121A, a first control unit 122A, and a first light-emitting unit 123A. The first control unit 122A is connected to the first signal receiving unit 121A and the first light-emitting unit 123A. The first signal receiving unit 121A receives the radio frequency control signal Fs. The first control unit 122A compares the signal strength of the radio frequency control signal Fs with the threshold value and activates the first light-emitting unit 123A when the signal strength of the radio frequency control signal Fs exceeds the threshold value. In one embodiment, the first signal receiving unit 121A can be a Bluetooth module. In another embodiment, the first signal receiving unit 121A can also be a ZigBee module or other similar components. In one embodiment, the first control unit 122A can be a microcontroller MCU. In another embodiment, the first control unit 122A can also be a central processing unit CPU, an application-specific integrated circuit ASIC, a field-programmable gate array FPGA, or other similar components. In one embodiment, the first light-emitting unit 123A can be a light-emitting diode LED. In another embodiment, the first light-emitting unit 123A can be a light-emitting diode array or other similar components.

The embodiment just exemplifies the present invention and is not intended to limit the scope of the present invention; any equivalent modification and variation according to the spirit of the present invention is to be also included within the scope of the following claims and their equivalents.

As shown in FIG. 3, the second light-emitting module 12B includes a second signal receiving unit 121B, a second control unit 122B, and a second light-emitting unit 123B. The second control unit 122B is connected to the second signal receiving unit 121B and the second light-emitting unit 123B. The second signal receiving unit 121B receives the radio frequency control signal Fs. The second control unit 122B compares the signal strength of the radio frequency control signal Fs with the threshold value and activates the second light-emitting unit 123B when the signal strength of the radio frequency control signal Fs exceeds the threshold value. In one embodiment, the second signal receiving unit 121B can be a Bluetooth module. In another embodiment, the second signal receiving unit 121B can also be a ZigBee module or other similar components. In one embodiment, the second control unit 122B can be an MCU. In another embodiment, the second control unit 122B can also be a CPU, an ASIC, a FPGA, or other similar components. In one embodiment, the second light-emitting unit 123B can be a LED. In another embodiment, the second light-emitting unit 123B can be a LED array or other similar components.

The embodiment just exemplifies the present invention and is not intended to limit the scope of the present invention; any equivalent modification and variation according to the spirit of the present invention is to be also included within the scope of the following claims and their equivalents.

As shown in FIG. 4, similarly, the third light-emitting module 12C includes a third signal receiving unit 121C, a third control unit 122C, and a third light-emitting unit 123C. The third control unit 122C is connected to the third signal receiving unit 121C and the third light-emitting unit 123C. The third signal receiving unit 121C receives the radio frequency control signal Fs. The third control unit 122C compares the signal strength of the radio frequency control signal Fs with the threshold value and activates the third light-emitting unit 123C when the signal strength of the radio frequency control signal Fs exceeds the threshold value. In one embodiment, the third signal receiving unit 121C can be a Bluetooth module. In another embodiment, the third signal receiving unit 121C can also be a ZigBee module or other similar components. In one embodiment, the third control unit 122C can be an MCU. In another embodiment, the third control unit 122C can also be a CPU, an ASIC, a FPGA, or other similar components. In one embodiment, the third light-emitting unit 123C can be a LED. In another embodiment, the third light-emitting unit 123C can be a LED array or other similar components.

The embodiment just exemplifies the present invention and is not intended to limit the scope of the present invention; any equivalent modification and variation according to the spirit of the present invention is to be also included within the scope of the following claims and their equivalents.

Figure 5:
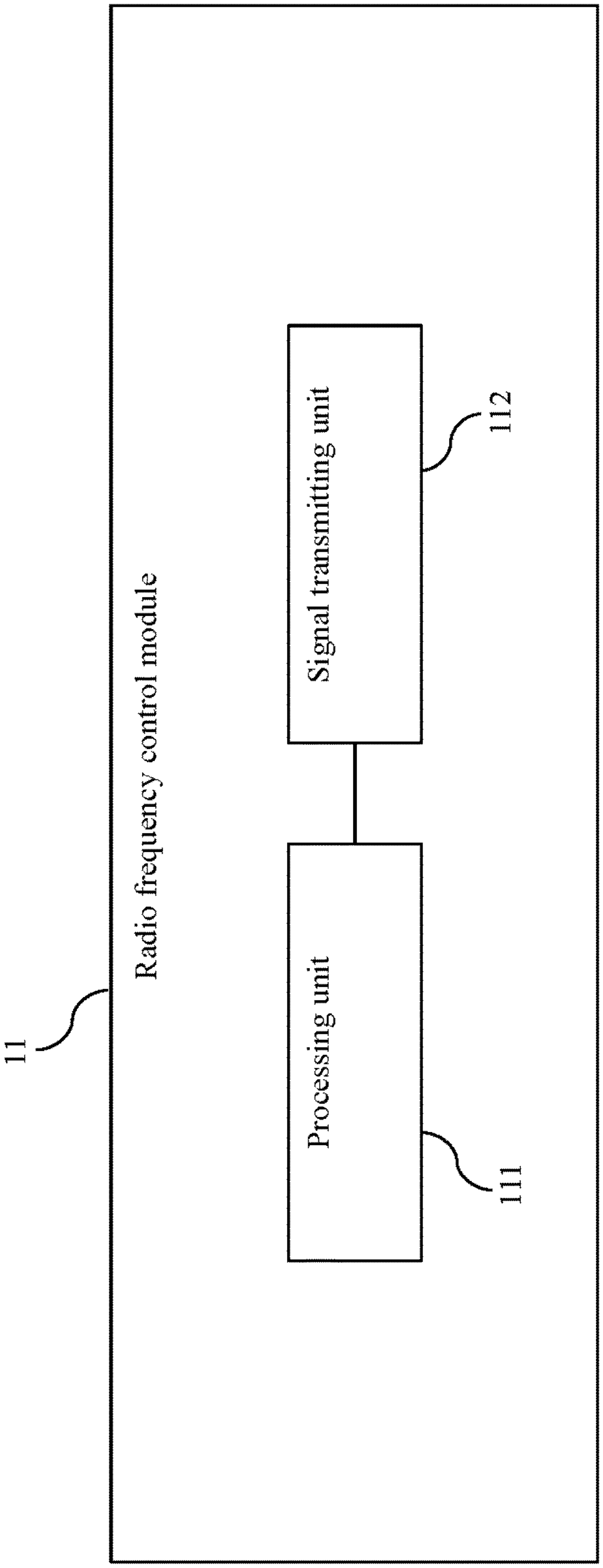
FIG. 5 is the block diagram of the circuit of the radio frequency control module of the lighting system with illumination range adjustment function based on radio frequency signal control in accordance with one embodiment of the present invention.

Please refer to FIG. 5, which is the block diagram of the circuit of the radio frequency control module of the lighting system with illumination range adjustment function based on radio frequency signal control in accordance with one embodiment of the present invention. As shown in FIG. 5, the radio frequency control module 11 includes a processing unit 111 and a signal transmitting unit 112. The processing unit 111 is connected to the signal transmitting unit 112. The processing unit 111 controls the signal transmitting unit 112 to generate the radio frequency control signal Fs. In one embodiment, the processing unit 111 can be an MCU. In another embodiment, the processing unit 111 can also be a CPU, an ASIC, a FPGA, or other similar components. In one embodiment, the signal transmitting unit 112 can be a Bluetooth module. In another embodiment, the signal transmitting unit 112 can also be a ZigBee module or other similar components. Additionally, the radio frequency control module 11 of the lighting system 1 can also have a plurality of power adjustment switches corresponding to different power levels respectively. The user can directly change the illumination range of the lighting system 1 by operating the power adjustment switch of the radio frequency control module 11, such that the lighting system 1 can achieve the desired illumination range.

The embodiment just exemplifies the present invention and is not intended to limit the scope of the present invention; any equivalent modification and variation according to the spirit of the present invention is to be also included within the scope of the following claims and their equivalents.

It is worthy to point out that intelligent lighting devices generally adopt technologies such as sound control, microwave sensing, and infrared sensing. However, in environments like mines, tunnels, or automated production workshops, noise or high temperatures are often generated, which can interfere with the sensing functions of currently available intelligent lighting devices. This interference renders these lighting devices unsuitable for use in the aforementioned environments. By contrast, according to one embodiment of the present invention, a lighting system includes a radio frequency control module, a first light-emitting module and a second light-emitting module. The radio frequency control module is disposed at a central point and generates a radio frequency control signal. The first light-emitting module receives the radio frequency control signal. A first reference circle passes through the first light-emitting module, and the center of the first reference circle coincides with the central point. The second light-emitting module receives the radio frequency control signal. A second reference circle passes through the second light-emitting module, and the center of the second reference circle coincides with the central point. The first light-emitting module is activated when the signal strength of the radio frequency control signal exceeds a threshold value, and the second light-emitting module is activated when the signal strength of the radio frequency control signal exceeds the threshold value. The first light-emitting module remains in off state when the signal strength of the radio frequency control signal is less than the threshold value. The second light-emitting module remains in off state when the signal strength of the radio frequency control signal is less than the threshold value. As described above, the lighting system has an illumination adjustment function based on radio frequency signal control. That is to say, the light-emitting module of the lighting system can filter out radio frequency control signals with insufficient signal strength and only activate when the signal strength of the radio frequency control signal exceeds the preset threshold value. Therefore, the control mechanism of the lighting system can be applied in high-temperature or highly interfered environments to prevent the light-emitting module from being triggered by mistake. As a result, the lighting system can be more comprehensive in application.

Also, according to one embodiment of the present invention, the lighting system has an illumination range adjustment function based on radio frequency signal control, which can adjust the signal strength of the radio frequency control signal to change the illumination range of the lighting system. Therefore, the lighting system can provide an effective illumination range adjustment mechanism to offer good lighting functionality. In this way, the lighting device can meet actual requirements.

Further, according to one embodiment of the present invention, the radio frequency control module of the lighting system has a plurality of power adjustment switches, each corresponding to different power levels. Through this design, the user can directly change the illumination range of the lighting system by operating the power adjustment switches of the radio frequency control module, allowing the lighting system to achieve the desired illumination range. Therefore, the lighting system can be more convenient in use and meet the user's needs.

Moreover, according to one embodiment of the present invention, the lighting system has an illumination range adjustment function based on radio frequency signal control, which can be used to implement various intelligent functions. In this way, the lighting system can be integrated with various currently available intelligent systems and achieve good integration effects. Therefore, the lighting system can meet the needs of different applications.

Furthermore, according to one embodiment of the present invention, the design of the lighting system is simple, so it can achieve the desired effect without significantly increasing costs and can effectively solve the problems of the currently available technology. Therefore, the lighting system can achieve excellent practicality and meet the trends of future development.

Figure 6:
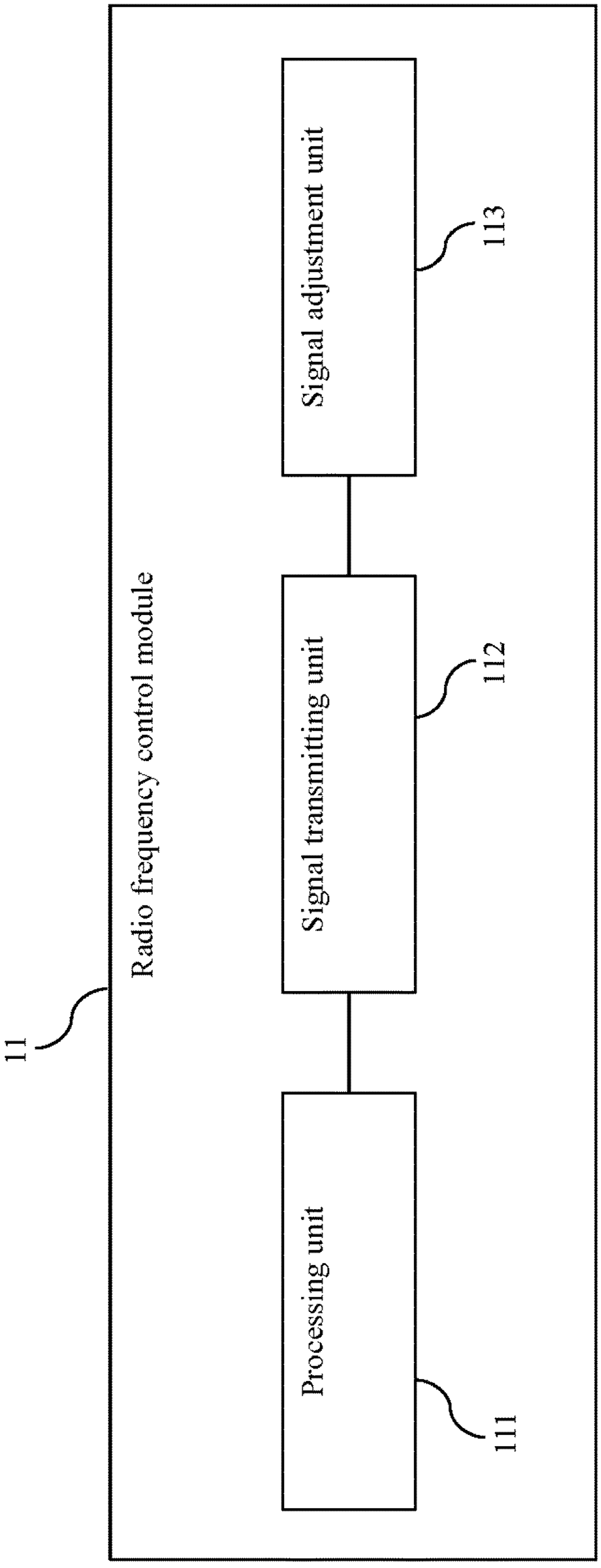
FIG. 6 is the block diagram of the circuit of the radio frequency control module of the lighting system with illumination range adjustment function based on radio frequency signal control in accordance with another embodiment of the present invention.

Please refer to FIG. 6, which is the block diagram of the circuit of the radio frequency control module of the lighting system with illumination range adjustment function based on radio frequency signal control in accordance with another embodiment of the present invention. As shown in FIG. 6, the radio frequency control module 11 includes a processing unit 111 and a signal transmitting unit 112. The processing unit 111 is connected to the signal transmitting unit 112.

The difference between this embodiment and the previous embodiment is that the radio frequency control module 11 further includes a signal adjustment unit 113. The signal adjustment unit 113 is used to generate an intensity signal. The processing unit 111 controls the signal transmitting unit 112 to generate a radio frequency control signal Fs corresponding to the intensity signal based on the intensity signal. The signal adjustment unit 113 can be a plurality of power adjustment switches corresponding to different power levels respectively. These power adjustment switches can be buttons, knobs, or other similar components. In this embodiment, the signal adjustment unit 113 is three power adjustment switches, corresponding to the first power level, the second power level, and the third power level. The third power level is greater than the second power level, and the second power level is greater than the first power level.

The embodiment just exemplifies the present invention and is not intended to limit the scope of the present invention; any equivalent modification and variation according to the spirit of the present invention is to be also included within the scope of the following claims and their equivalents.

Figure 7:
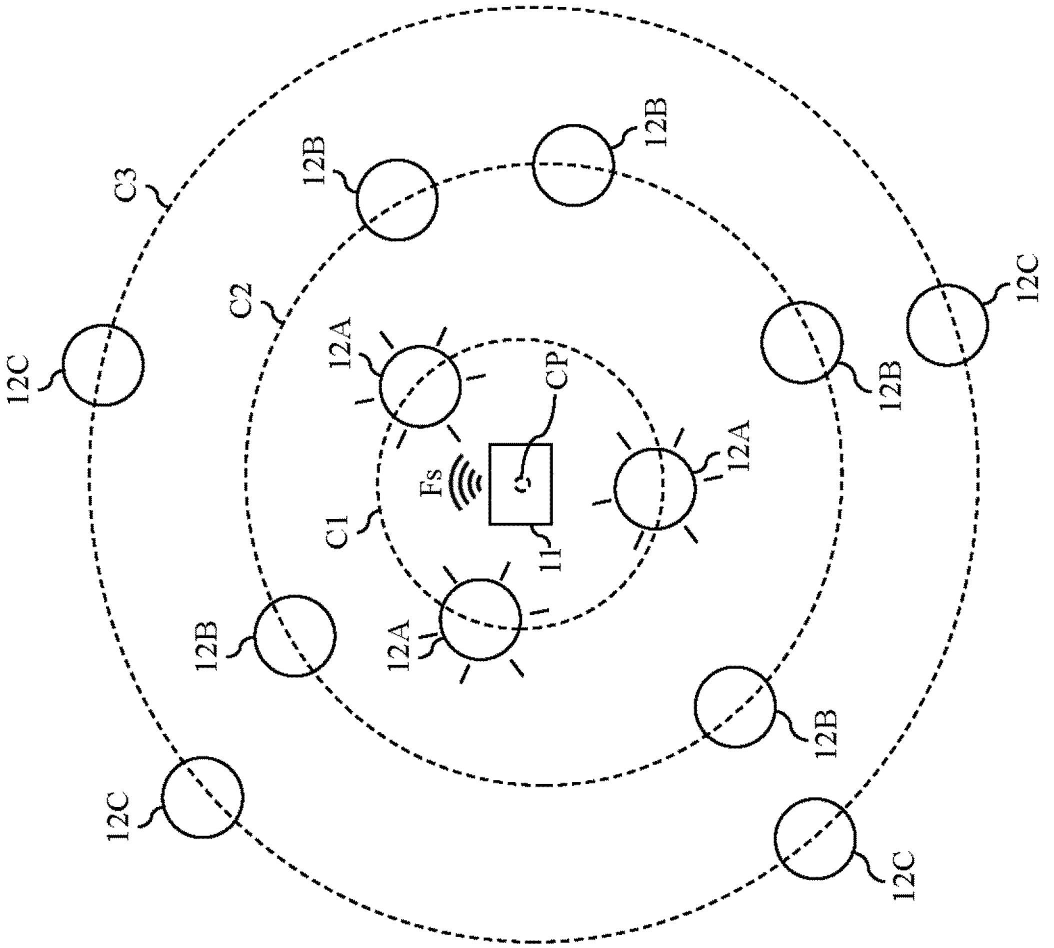
FIG. 7 is the first schematic view of the operating state of the lighting system with illumination range adjustment function based on radio frequency signal control in accordance with another embodiment of the present invention.

Please refer to FIG. 7, which is the first schematic view of the operating state of the lighting system with illumination range adjustment function based on radio frequency signal control in accordance with another embodiment of the present invention. As shown in FIG. 7, the lighting system 1 includes a radio frequency control module 11, a plurality of first light-emitting modules 12A, a plurality of second light-emitting modules 12B, and a plurality of third light-emitting modules 13C.

When the user adjusts the signal adjustment unit 113 to the first power level, the signal adjustment unit 113 generates an intensity signal corresponding to the first power. Then, the processing unit 111 controls the signal transmitting unit 112 to generate a radio frequency control signal Fs corresponding to the intensity signal (first power) based on the intensity signal. Each first light-emitting module 12A receives the radio frequency control signal Fs and compares the radio frequency control signal Fs with a preset threshold value. Since the signal intensity of the radio frequency control signal Fs is greater than the threshold value, the multiple first light-emitting modules 12A enter on state. However, since the signal intensity of the radio frequency control signal Fs has attenuated below the threshold value when it is transmitted to the second light-emitting modules 12B, the second light-emitting modules 12B remain in off state. Similarly, the third light-emitting modules 12C remain in off state.

The embodiment just exemplifies the present invention and is not intended to limit the scope of the present invention; any equivalent modification and variation according to the spirit of the present invention is to be also included within the scope of the following claims and their equivalents.

Figure 8:
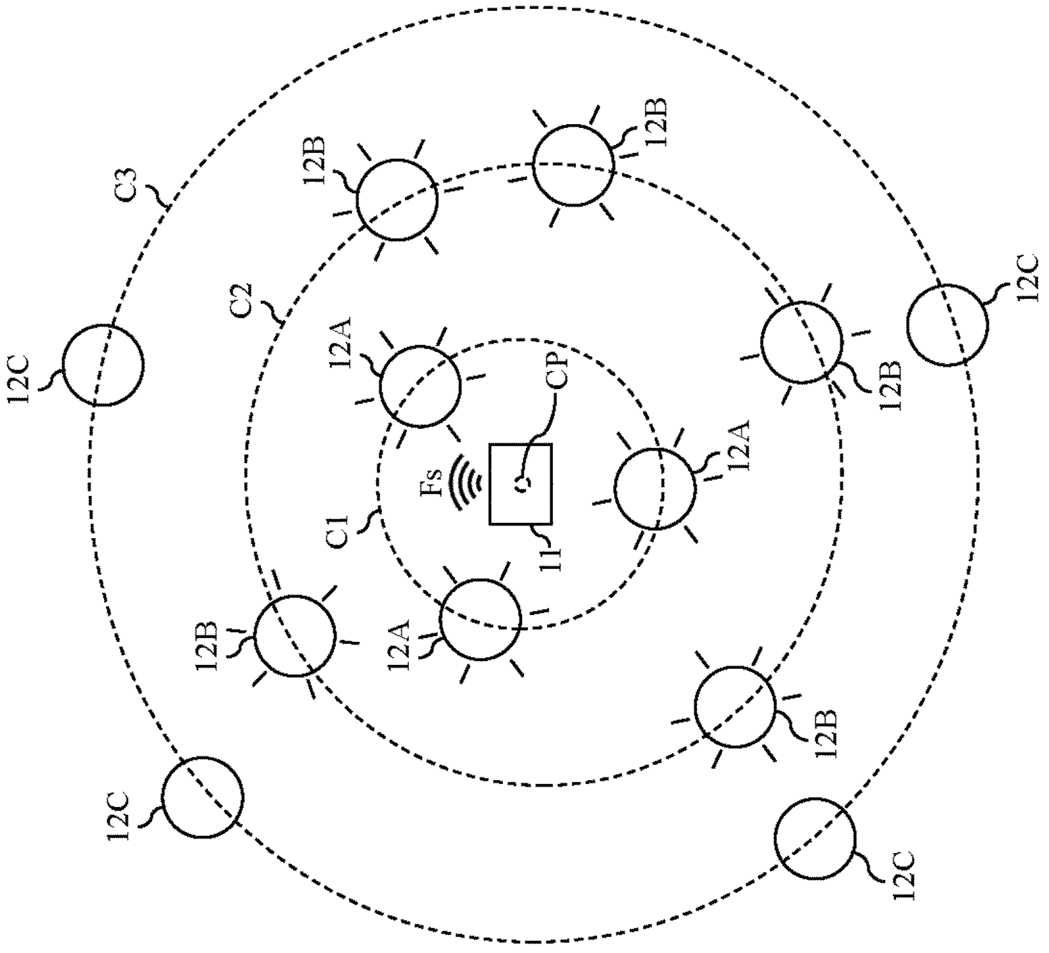
FIG. 8 is the second schematic view of the operating state of the lighting system with illumination range adjustment function based on radio frequency signal control in accordance with another embodiment of the present invention.

Please refer to FIG. 8, which is the second schematic view of the operating state of the lighting system with illumination range adjustment function based on radio frequency signal control in accordance with another embodiment of the present invention. As shown in FIG. 8, when the user adjusts the signal adjustment unit 113 to the second power level, the signal adjustment unit 113 generates an intensity signal corresponding to the second power. Then, the processing unit 111 controls the signal transmitting unit 112 to generate a radio frequency control signal Fs corresponding to the intensity signal (second power) based on the intensity signal. Each first light-emitting module 12A and each second light-emitting module 12B receive the radio frequency control signal Fs and compare the radio frequency control signal Fs with a preset threshold value. Since the signal intensity of the radio frequency control signal Fs is greater than the threshold value, the first light-emitting modules 12A and the second light-emitting modules 12B enter on state. However, since the signal intensity of the radio frequency control signal Fs has attenuated below the threshold value when it is transmitted to the third light-emitting modules 12C, the third light-emitting modules 12C remain in off state.

The embodiment just exemplifies the present invention and is not intended to limit the scope of the present invention; any equivalent modification and variation according to the spirit of the present invention is to be also included within the scope of the following claims and their equivalents.

Figure 9:
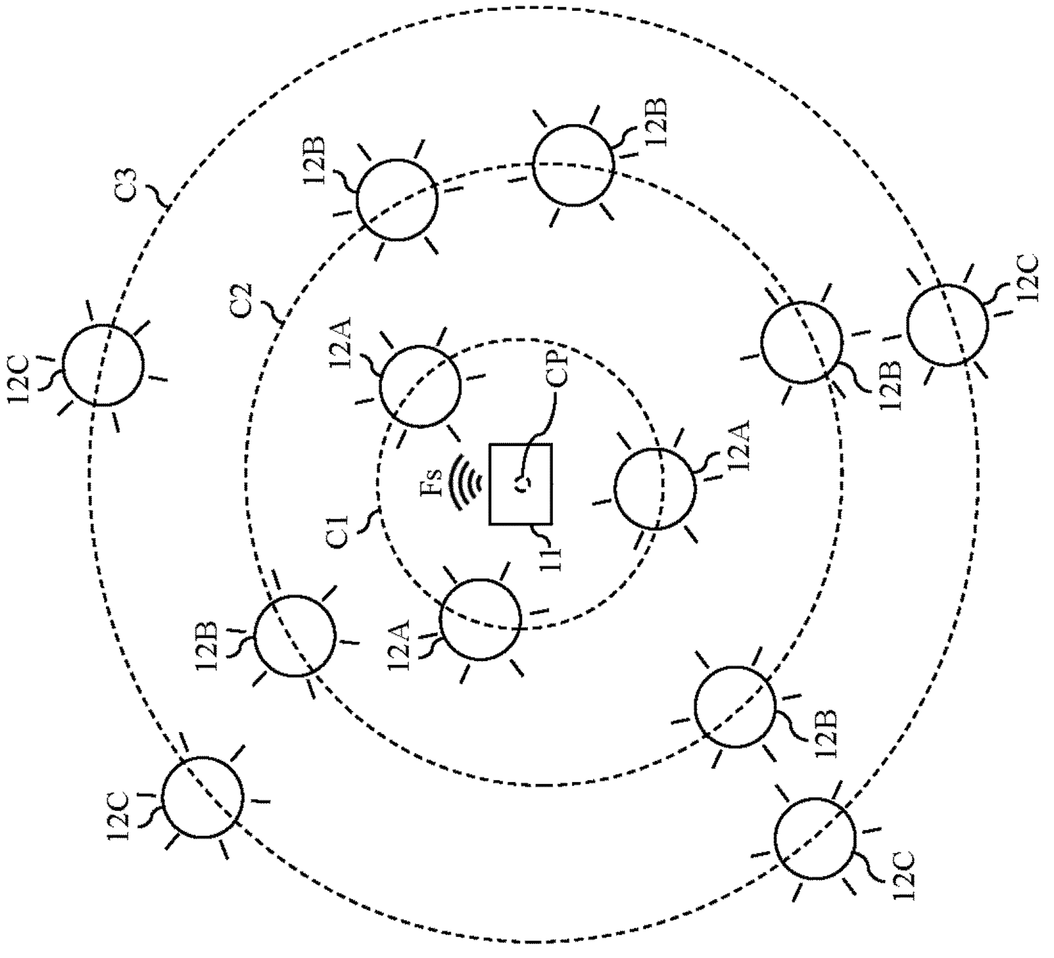
FIG. 9 is the third schematic view of the operating state of the lighting system with illumination range adjustment function based on radio frequency signal control in accordance with another embodiment of the present invention.

Please refer to FIG. 9, which is the third schematic view of the operating state of the lighting system with illumination range adjustment function based on radio frequency signal control in accordance with another embodiment of the present invention. As shown in FIG. 9, when the user adjusts the signal adjustment unit 113 to the third power level, the signal adjustment unit 113 generates an intensity signal corresponding to the third power. Then, the processing unit 111 controls the signal transmitting unit 112 to generate a radio frequency control signal Fs corresponding to the intensity signal (third power) based on the intensity signal. Each first light-emitting module 12A, each second light-emitting module 12B, and each third light-emitting module 12C receive the radio frequency control signal Fs and compare the radio frequency control signal Fs with a preset threshold value. Since the signal intensity of the radio frequency control signal Fs is greater than the threshold value, all light-emitting modules (first light-emitting module 12A, second light-emitting module 12B, and third light-emitting module 12C) enter on state.

As set forth above, the radio frequency control module 11 of the lighting system 1 has several power adjustment switches corresponding to different power levels respectively. Via the above design, the user can directly change the illumination range of the lighting system 1 by operating the power adjustment switches of the radio frequency control module 11, so that the lighting system 1 can achieve the desired illumination range. Therefore, the lighting system 1 can be more convenient in use and can better meet the needs of the user.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, a lighting system includes a radio frequency control module, a first light-emitting module and a second light-emitting module. The radio frequency control module is disposed at a central point and generates a radio frequency control signal. The first light-emitting module receives the radio frequency control signal. A first reference circle passes through the first light-emitting module, and the center of the first reference circle coincides with the central point. The second light-emitting module receives the radio frequency control signal. A second d reference circle passes the second light-emitting module, and the center of the second reference circle coincides with the central point. The first light-emitting module is activated when the signal strength of the radio frequency control signal exceeds a threshold value, and the second light-emitting module is activated when the signal strength of the radio frequency control signal exceeds the threshold value. The first light-emitting module remains in off state when the signal strength of the radio frequency control signal is less than the threshold value. The second light-emitting module remains in off state when the signal strength of the radio frequency control signal is less than the threshold value. As described above, the lighting system has an illumination adjustment function based on radio frequency signal control. That is to say, the light-emitting module of the lighting system can filter out radio frequency control signals with insufficient signal strength and only activate when the signal strength of the radio frequency control signal exceeds the preset threshold value. Therefore, the control mechanism of the lighting system can be applied in high-temperature or highly interfered environments to prevent the light-emitting module from being triggered by mistake. As a result, the lighting system can be more comprehensive in application.

Also, according to one embodiment of the present invention, the lighting system has an illumination range adjustment function based on radio frequency signal control, which can adjust the signal strength of the radio frequency control signal to change the illumination range of the lighting system. Therefore, the lighting system can provide an effective illumination range adjustment mechanism to offer good lighting functionality. In this way, the lighting device can meet actual requirements.

Further, according to one embodiment of the present invention, the radio frequency control module of the lighting system has a plurality of power adjustment switches, each corresponding to different power levels. Through this design, the user can directly change the illumination range of the lighting system by operating the power adjustment switches of the radio frequency control module, allowing the lighting system to achieve the desired illumination range. Therefore, the lighting system can be more convenient in use and meet the user's needs.

Moreover, according to one embodiment of the present invention, the lighting system has an illumination range adjustment function based on radio frequency signal control, which can be used to implement various intelligent functions. In this way, the lighting system can be integrated with various currently available intelligent systems and achieve good integration effects. Therefore, the lighting system can meet the needs of different applications.

Furthermore, according to one embodiment of the present invention, the design of the lighting system is simple, so it can achieve the desired effect without significantly increasing costs and can effectively solve the problems of the currently available technology. Therefore, the lighting system can achieve excellent practicality and meet the trends of future development.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting system with illumination range adjustment function based on radio frequency signal control, comprising:

a radio frequency control module disposed at a central point and configured to generate a radio frequency control signal;

a first light-emitting module configured to receive the radio frequency control signal, wherein a first reference circle passes through the first light-emitting module, and a center of the first reference circle coincides with the central point; and a second light-emitting module configured to receive the radio frequency control signal, wherein a second reference circle passes through the second light-emitting module, and a center of the second reference circle coincides with the central point;

wherein the first light-emitting module is activated when a signal strength of the radio frequency control signal exceeds a threshold value, and the second light-emitting module is activated when the signal strength of the radio frequency control signal exceeds the threshold value.

2. The lighting system with illumination range adjustment function based on radio frequency signal control as claimed in claim 1, wherein the signal strength of the radio frequency control signal is lower than the threshold value after the radio frequency control signal is transmitted a preset distance.

3. The lighting system with illumination range adjustment function based on radio frequency signal control as claimed in claim 1, wherein a diameter of the second reference circle is greater than a diameter of the first reference circle.

4. The lighting system with illumination range adjustment function based on radio frequency signal control as claimed in claim 1, wherein the first light-emitting module remains in off state when the signal strength of the radio frequency control signal is less than the threshold value.

5. The lighting system with illumination range adjustment function based on radio frequency signal control as claimed in claim 1, wherein the second light-emitting module remains in off state when the signal strength of the radio frequency control signal is less than the threshold value.

6. The lighting system with illumination range adjustment function based on radio frequency signal control as claimed in claim 1, wherein the first light-emitting module comprises a first signal receiving unit, a first control unit, and a first light-emitting unit, wherein the first signal receiving unit is configured to receive the radio frequency control signal, the first control unit is configured to compare the signal strength of the radio frequency control signal with the threshold value, and activate the first light-emitting unit when the signal strength of the radio frequency control signal exceeds the threshold value.

7. The lighting system with illumination range adjustment function based on radio frequency signal control as claimed in claim 1, wherein the second light-emitting module comprises a second signal receiving unit, a second control unit, and a second light-emitting unit, wherein the second signal receiving unit is configured to receive the radio frequency control signal, the second control unit is configured to compare the signal strength of the radio frequency control signal with the threshold value, and activate the second light-emitting unit when the signal strength of the radio frequency control signal exceeds the threshold value.

8. The lighting system with illumination range adjustment function based on radio frequency signal control as claimed in claim 1, wherein the radio frequency control module comprises a processing unit, a signal transmitting unit, and a signal adjustment unit, wherein the signal adjustment unit is configured to generate an intensity signal, and the processing unit is configure to control the signal transmitting unit to generate the radio frequency control signal corresponding to the intensity signals according to the intensity signal.

9. The lighting system with illumination range adjustment function based on radio frequency signal control as claimed in claim 1, further comprising a third light-emitting module, wherein the third light-emitting module is configured to receive the radio frequency control signal, a third reference circle passes through the third light-emitting module, and a center of the third reference circle coincides with the central point, wherein the third light-emitting module is activated when the signal strength of the radio frequency control signal exceeds the threshold value and remains in off state when the signal strength of the radio frequency control signal is less than the threshold value.

10. The lighting system with illumination range adjustment function based on radio frequency signal control as claimed in claim 9, wherein a diameter of the third reference circle is greater than a diameter of the second reference circle.

* * * * *